(12) United States Patent
Nicholson

(10) Patent No.: US 7,940,816 B2
(45) Date of Patent: May 10, 2011

(54) FIGURE EIGHT FIBER LASER FOR ULTRASHORT PULSE GENERATION

(75) Inventor: Jeffrey W. Nicholson, Morristown, NJ (US)

(73) Assignee: OFS Fitel LLC, Norcross, GA (US)

(*) Notice: Subject to any disclaimer, the term of this patent is extended or adjusted under 35 U.S.C. 154(b) by 118 days.

(21) Appl. No.: 12/231,803

(22) Filed: Sep. 5, 2008

(65) Prior Publication Data

US 2010/0061407 A1 Mar. 11, 2010

(51) Int. Cl.
*H01S 3/30* (2006.01)

(52) U.S. Cl. .............................................. 372/6

(58) Field of Classification Search ............... 372/6
See application file for complete search history.

(56) References Cited

U.S. PATENT DOCUMENTS

| | | | | |
|---|---|---|---|---|
| 4,720,160 A * | 1/1988 | Hicks, Jr. ...................... 385/31 |
| 5,008,887 A | 4/1991 | Kafka et al. |
| 5,050,183 A | 9/1991 | Duling, III |
| 5,450,427 A * | 9/1995 | Fermann et al. .............. 372/10 |
| 5,488,475 A * | 1/1996 | Friebele et al. ............. 356/478 |
| 5,513,194 A | 4/1996 | Tamura et al. |
| 5,537,671 A * | 7/1996 | Toyama et al. ............... 385/27 |
| 5,577,057 A | 11/1996 | Frisken |
| 5,617,434 A | 4/1997 | Tamura et al. |
| 5,734,665 A | 3/1998 | Jeon et al. |
| 5,812,567 A | 9/1998 | Jeon et al. |
| 5,923,686 A | 7/1999 | Fermann et al. |
| 6,097,741 A | 8/2000 | Lin et al. |
| 6,163,630 A | 12/2000 | Evans |
| 6,181,990 B1 | 1/2001 | Grabowsky et al. |
| 6,198,860 B1 | 3/2001 | Johnson et al. |
| 6,298,074 B1 | 10/2001 | Jeon et al. |
| 6,373,867 B1 | 4/2002 | Lin et al. |
| 6,385,216 B1 | 5/2002 | Chang et al. |
| 6,570,892 B1 | 5/2003 | Lin et al. |
| 6,959,021 B2 | 10/2005 | Po et al. |
| 7,181,116 B2 | 2/2007 | Sigel, Jr. et al. |
| 7,233,607 B2 | 6/2007 | Richardson et al. |
| 7,372,880 B2 | 5/2008 | Jablonski et al. |
| 2006/0245456 A1* | 11/2006 | Lasri et al. ...................... 372/18 |
| 2007/0110354 A1 | 5/2007 | J. Booth et al. |
| 2007/0140634 A1 | 6/2007 | Windeler et al. |
| 2008/0144676 A1 | 6/2008 | Nicholson |

FOREIGN PATENT DOCUMENTS

WO    WO 98/40939    9/1998

OTHER PUBLICATIONS

Taverner et al., "Polarisation Maintaining Figure-8 Laser", Optoelectronics Research Centre, (Cambridge, 1993).
Li, et al., "Al/Ge co-doped large mode area fiber with high SBS Threshold", Optics Express, Jun. 25, 2007/ vol. 15, No. 13, pp. 8290-8299.

* cited by examiner

*Primary Examiner* — Minsun Harvey
*Assistant Examiner* — Kinam Park
(74) *Attorney, Agent, or Firm* — Wendy W. Koba

(57) ABSTRACT

A polarization-maintaining figure eight (PMFE) fiber laser is configured to generate ultrashort (femtosecond) output pulses by intentionally inserting asymmetry (in the form of a phase bias) into the bi-directional loop of the fiber laser. The introduction of asymmetry (via an asymmetric coupler, splice, attenuator, fiber bend, multiple amplifying sections, or the like) allows for an accumulation of phase difference within the bi-directional loop sufficient to create modelocking and generate ultrashort output pulses.

13 Claims, 4 Drawing Sheets

FIGURE EIGHT FIBER LASER FOR ULTRASHORT PULSE GENERATION

TECHNICAL FIELD

The present invention relates to a figure eight mode-locked fiber laser and, more particularly, to a polarization maintaining figure eight (PMFE) laser with additional bias introduced into the bi-directional loop to generate ultrashort (fs) pulses of a desired spectral width.

BACKGROUND OF THE INVENTION

Ultra short optical pulses can be used in a number of applications including optical information processing and data communication, optical probing with high temporal resolution, laser surgery, and material processing. In particular, recent advances in optical data communication with data rates up to 2.5 Gbit/s or higher demand compact, ultra fast light sources with low maintenance, high reliability, and low cost.

Fiber lasers have been developed as a new generation of compact, inexpensive and robust light sources. In essence, a fiber laser is an optically-pumped resonator with a section of doped-fiber as the gain medium. As the gain exceeds the total optical loss in the resonator, a laser oscillation can be generated. Many different dopants can be used to achieve laser oscillations at different wavelengths. Atomic transitions in rare-earth ions can be used to produce lasers from visible wavelengths to far infrared wavelengths (e.g., 0.45 µm-3.5 µm). Erbium-doped fiber lasers for producing optical pulses at 1.55 µm are particularly useful for optical fiber communication since the optical loss in commonly used silica fibers is minimum at about 1.55 µm.

Mode-locked fiber lasers can use various cavity configurations such as linear, ring, and figure-eight geometries. See, for example, U.S. Pat. No. 5,008,887 issued to Kafka et al. on Apr. 16, 1991 and U.S. Pat. No. 5,513,194 issued to Tamura et al. on Apr. 30, 1996. However constructed, a mode-locked fiber laser is configured to have multiple longitudinal modes that simultaneously oscillate. A mode-locking mechanism is implemented in the resonator to synchronize the phases of different modes in such a way that the phase difference between any two adjacent modes is a constant. These phase-locked modes constructively add to one another to produce a short pulse.

Two common mode-locking schemes are "active" mode locking and "passive" mode locking. Active mode locking modulates either the amplitude or the phase of the intra-cavity optical field at a frequency equal to one or a multiplicity of the mode spacing. Active mode locking can be implemented by using intra-cavity electro-optic and acousto-optic modulators.

Alternatively, passive mode locking uses at least one nonlinear optical element inside the resonator to produce an intensity-dependent response to an optical pulse so that the pulse width of the optical pulse exiting the nonlinear element is reduced. Compared to the active mode locking, passive mode locking can be used advantageously to produce ultra short light sources. Commonly-used passive mode locking techniques include saturable absorbers, figure-eight lasers and intensity-dependent nonlinear polarization rotation. In the case of a figure-eight laser, the nonlinear element that provides an intensity-dependent response takes the form of a nonlinear optical loop mirror.

Mode-locked fiber lasers typically require a balance of "normal" (i.e., negative) and "anomalous" (i.e., positive) dispersion fibers to achieve ultra-short pulses. U.S. patent application Ser. No. 11/985,442, which is assigned to the assignee of this application and herein incorporated by reference, discloses the first known PMFE laser utilizing dispersion management to produce ultra-short pulses. An external modulating signal source (either phase or amplitude) is utilized with this PMFE arrangement to trigger the lasing process. Once stimulated, the external signal source can be removed and the PMFE laser will be mode-locked and sustain operation.

While this PMFE of the assignee has been successful in overcoming many of the problems of the prior art, the use of only polarization-maintaining fiber in the arrangement eliminates the need for polarization control components, which had heretofore been used to not only control the polarization state, but introduce the optical bias necessary to generate ultrashort optical pulses. As a result, the inability to adjust the bias of the bi-directional loop makes it difficult to reliably and reproducibly construct a PMFE laser. Thus, a need remains for a PMFE fiber laser which maintains the benefits of the polarization-maintaining arrangement, yet is able to generate the ultrashort pulses required for many applications.

SUMMARY OF THE INVENTION

The limitations of the prior art are addressed by the present invention, which relates to a PMFE fiber laser and, more particularly, to a PMFE fiber laser incorporating additional optical bias in the bi-directional loop to create the necessary shift between counter propagating signals to create ultrashort output pulses, on the order of about 100 femtoseconds.

In accordance with the present invention, a PMFE fiber laser is modified to incorporate an additional variable loss component in the bi-directional loop to create an optical bias condition sufficient to generate ultrashort optical pulses. The bi-directional loop in the PMFE laser provides the ultrafast saturable absorption which leads to passive modelocking by providing an intensity-dependent transmission. By incorporating bias in this loop, a phase difference will accumulate between the counter propagating fields in the loop sufficient to generate the desired ultrashort output pulses.

In one embodiment, the bias is introduced in the form of an asymmetric splitter between the two loops in the laser. An additional loss element (which may be adjustable, such as a variable optical attenuator (VOA) or similar attenuation element) can also be inserted in the bi-directional loop as the bias component. In operation, the degree of attenuation may be adjusted during fabrication until optimum modelocking is achieved. In an alternative embodiment, the conventional input/output coupler for the PMFE laser can be moved to the bi-directional loop and thus add the required bias to the arrangement. The incorporation of various splice and/or bending losses in the bi-directional loop may be sufficient to allow for ultrashort pulse generation.

Other arrangements which may be used to introduce the bias in the bi-directional loop include, but are not limited to, imparting physical/mechanical changes to the bi-directional fiber (strain, stress, temperature, etc.).

Indeed, other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
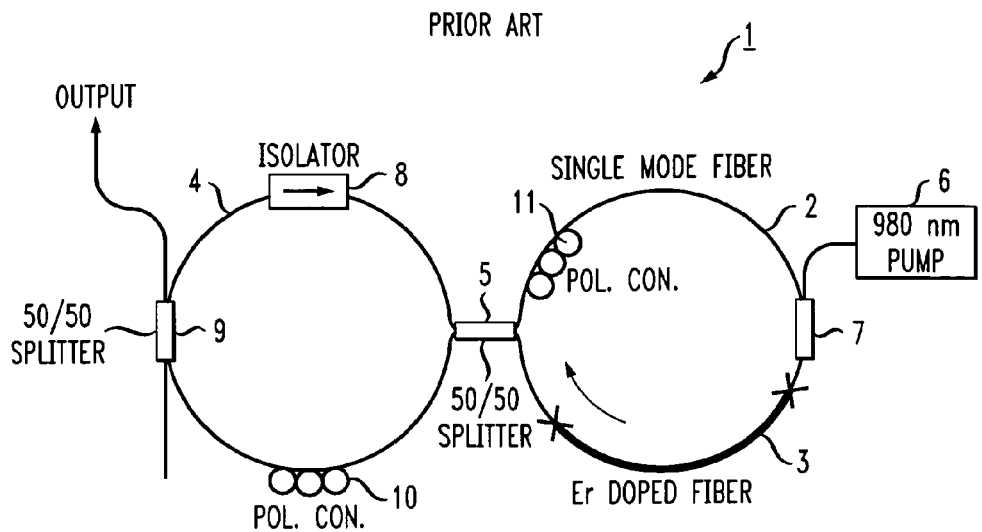
FIG. 1 illustrates a prior art figure eight fiber laser, using external/mechanical polarization controllers to maintain the polarization of the propagating signal and introduce the bias required to generate ultrashort output pulses.

Prior to describing the configuration and operation of the inventive PMFE fiber laser, both a basic figure-eight prior art fiber laser capable of generating ultrashort pulses and our previous PMFE arrangement will be described. Referring to FIG. 1, a prior art figure-eight fiber laser 1 includes a first loop 2 of single mode fiber, formed to include a section 3 of doped (normal dispersion) fiber to provide amplification. Typically, the length of doped fiber section 3 is selected based on the desired center operating wavelength of the laser. Erbium is one of the conventional rare-earth material choices for this type of fiber laser. First fiber loop 2 is coupled to a second loop 4 of single mode fiber through a 50:50 directional coupler 5. The single-mode fiber (SMF) used in the cavity typically exhibits anomalous (positive) dispersion at the desired 1550 nm operating wavelength used for communication systems. The combination of loops 2 and 4 with coupler 5 thus forms the "figure-eight" structure. A source 6 of pump light is coupled into first loop 2 via a coupler 7 (which may comprise, in one case, a wavelength division multiplexing element) to provide the light input for the structure.

Thereafter, the light amplified within section 3 of first loop 2 will continue to circulate around loop 2, exhibiting an increase in gain each time, with about half the signal power coupled into loop 4 during each pass. An isolator 8 in loop 4 will prevent any counter-propagating signal from being established within second loop 4. An output directional coupler 9 is also included in second loop 4 and is used to out-couple a fraction of the mode-locked laser output signal. Depending on the gain of the fiber and loss of other components in the cavity, this fraction can vary from a few percent to more than 50%, allowing for the figure-eight structure to remain passively mode-locked and continue to provide an output signal. A pair of mechanical polarization controllers 10 and 11 are disposed within loops 2 and 4 and used to maintain a consistent polarization state for the propagating signal. As mentioned above, polarization controllers 10 and 11 have been used in the past to tune the loop bias in a manner that allowed for ultrashort pulses (on the order of 100 femtoseconds) to be generated.

Figure 2:
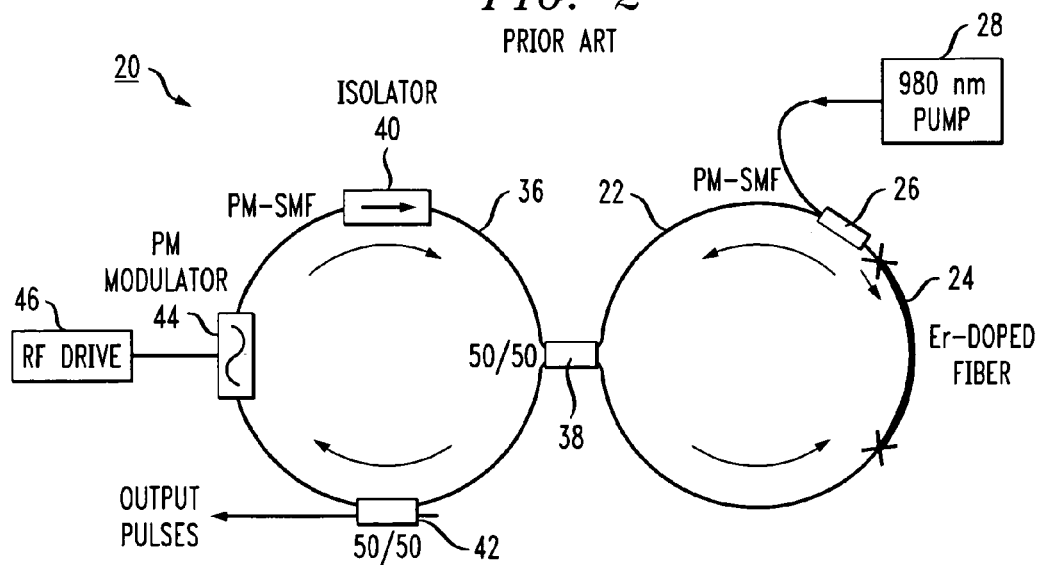
FIG. 2 illustrates a PMFE fiber laser of the prior art, which eliminates the need for external polarization control elements, but is limited in terms of generating ultrashort optical pulses.

FIG. 2 illustrates an exemplary PMFE fiber laser 20 as disclosed in our co-assigned application referenced above. In this arrangement, the need for mechanical polarization controllers has been eliminated by utilizing polarization maintaining fiber to form the loops. Further, it has been determined that for a passively mode-locked fiber to operate properly, an initial "boost" in modulation (either amplitude or phase) may be required for the arrangement to enter the regime of passive mode locking. All of these aspects of a PMFE are shown with particularity in the arrangement of FIG. 2.

Referring to the diagram, passively mode-locked PMFE fiber laser 20 comprises a first loop 22 of polarization maintaining, single mode fiber (PM-SMF) exhibiting the anomalous dispersion characteristic of single mode fiber. A section of erbium-doped (Er-doped), polarization maintaining fiber 24 is coupled to the PM-SMF to complete the geometry of first loop 22. Erbium-doped, polarization maintaining fiber 24 exhibits normal dispersion. A first input coupler 26 (also polarization maintaining) is used to inject a pump light signal from a pump source 28 into Er-doped fiber 24. The wavelength of pump source 28, in this case illustrated as 980 nm, is selected to provide amplification utilizing the Er dopant.

Laser 20 further comprises a second loop 36, also formed of polarization maintaining, single mode fiber (again, of anomalous, positive dispersion characteristic). A polarization maintaining 50:50 optical splitter 38 is used to couple first loop 22 to second loop 36 and thus direct the propagating signal between the two loops. A polarization maintaining in-line optical isolator 40 is included within second loop 36 to prevent the counter-propagation of the signal through the system. A polarization maintaining 50:50 output coupler 42 is provided to out-couple the mode-locked pulse signal from fiber laser 20. A polarization-maintaining modulator 44 is disposed along second loop 36 and is driven by an external drive source 46. The introduction of the external signal is sufficient to perturb the steady-state condition of laser 20 and initiate mode locking. Once mode locking has been sustained, drive 46 is disconnected from the system and passive mode-locking operation will continue via the Kerr nonlinearity effect in the nonlinear, amplifying loop mirror 22.

It has been found, however, that when the entire laser structure is formed of polarization maintaining components—such as laser 20 of FIG. 2—flexibility in the ability to tune the loop bias has been eliminated. For this reason, it remains difficult to reliably construct a "fully" PMFE laser that will readily modelock over a broad range of cavity layouts inasmuch as the fixed biasing in first loop 22 restricts the operating range of the laser.

Indeed, it has been found that building two fully PMFE lasers with the same configuration can produce lasers that have very different levels of performance. In extreme cases, one laser will modelock and produce ultra-short pulses while the second laser will only operate in continuous-wave (CW) mode. The difference in operation is due to variability in the optical loss associated with the various components used to form the laser, as well as the splice losses associated with joining one section of fiber to another. In order to reliably and repeatedly construct a PMFE laser that modelocks for a given cavity configuration, it has been determined that an additional flexibility in tuning the bias of the bi-directional loop must be re-introduced, or, both the spectral width (the FWHM value) and pulse width of the output will be limited.

Figure 3:
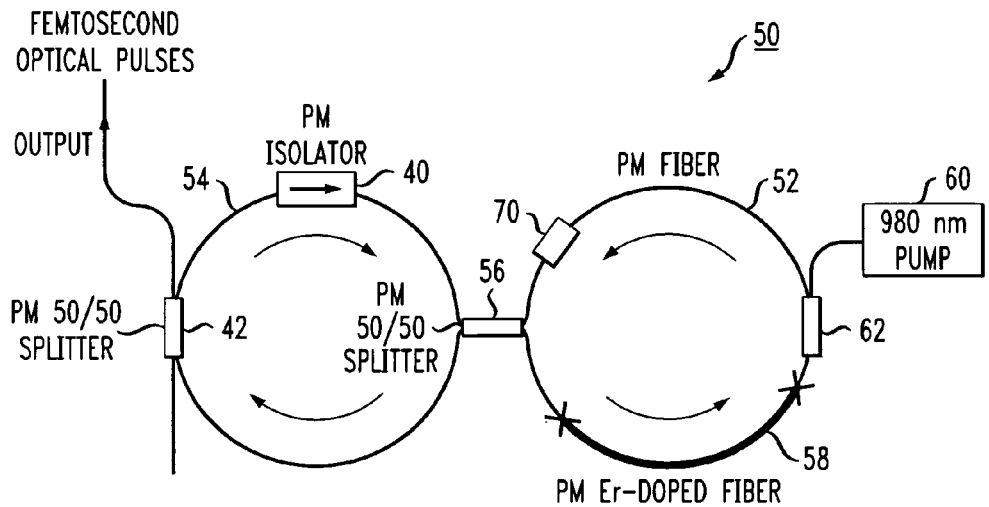
FIG. 3 shows an exemplary PMFE fiber laser formed in accordance with the present invention to generate ultrashort optical pulses by intentionally including a loss element within the bi-directional loop of the laser.

FIG. 3 illustrates a PMFE fiber laser 50 formed in accordance with the present invention to generate the desired ultrashort pulses by introducing 'optical bias' into the bi-directional loop of the fiber laser. As with the arrangement discussed above in association with FIG. 2, all of the components forming laser 50 are "polarization maintaining". For the sake of simplicity, the external modulation source components are not shown, but it is to be understood that such an arrangement may be useful in initiating passive modelocking in the PMFE fiber laser of the present invention. Accordingly, it is to be understood that an embodiment of the present invention as shown in FIG. 3 may be modified to include a phase/amplitude modulator and RF drive source, similar to components 44 and 46 of prior art FIG. 2.

Referring to FIG. 3, PMFE fiber laser 50 is shown as including a first, bi-directional fiber loop 52 comprised of polarization-maintaining fiber with anomalous (positive) dispersion and coupled to a second, unidirectional fiber loop 54 (also comprised of polarization-maintaining fiber with anomalous dispersion) via an optical splitter/coupler 56. In one embodiment, single mode fibers may be used in the formation of loops 54 and 56. Alternatively, multimode fiber may be used. In this particular embodiment, a conventional 50/50 splitter 56 is used. Bi-directional fiber loop 52 is shown as also including a section of polarization-maintaining erbium-doped fiber 58. Erbium-doped fiber 48 is used to create amplification of the circulating optical signal. A pump source 60 is used to introduce an optical pump signal into doped fiber 58 (operating at a wavelength of 980 nm, for example, when used with a section of erbium-doped fiber for section 58), where WDM element 62 may be used to couple pump source 60 to doped fiber 58. While this particular embodiment includes a fiber-based amplifier, it is to be understood that in its most general case a PMFE laser of the present invention may utilize any suitable type of optical amplifying gain medium within the laser structure. For example, a semiconductor optical amplifier may be used in place of erbium-doped fiber 58. Other types of gain structures are possible and all are considered to fall within the scope of the present invention.

In accordance with the present invention, the ability to tune the optical bias within PMFE laser 50 is provided by incorporating an optical loss element 70 in bi-directional loop 52. The intentional addition of loss within the bi-directional loop creates a phase difference between the counter-propagating signals. As a result, the counter-propagating fields will exhibit different powers and, therefore, build up different phases. The creation of such an intensity-dependent response—where low power (CW) light is reflected and high power (pulsed) light is transmitted—creates the necessary conditions for generation of ultrashort pulses in accordance with the present invention.

Figure 4:
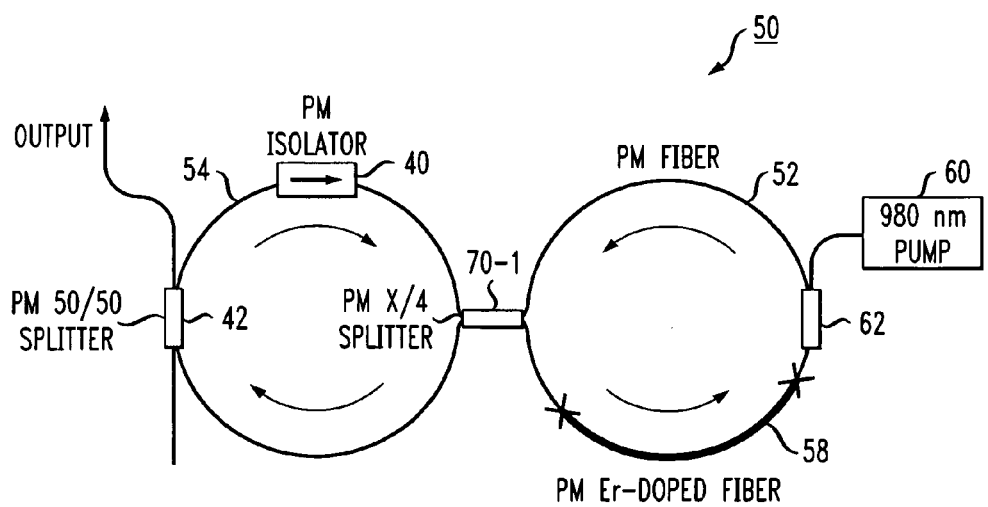
FIG. 4 illustrates one particular embodiment of the present invention, utilizing an asymmetric power splitter as the optical loss element.

Loss element 70 may take the form of any component suitable to create the desired buildup of a phase difference required to create the ultrashort pulses from the intensity-dependent response. In one case, as shown in FIG. 4, element 70 may comprise a non-symmetric splitter 70-1 disposed between bi-directional loop 52 and unidirectional loop 54. The selected power splitting ratio between loops 52 and 54, designated as X/Y in FIG. 4, is considered a design choice. By introducing an asymmetry into the power of the signals propagating within each loop, an asymmetry will accumulate in the counter propagating fields so as to create the desired bias in the phase. The bias in the phase will, in effect, 'sharpen' the output pulse to allow for ultrashort, femtosecond output pulses to be generated.

Figure 5:
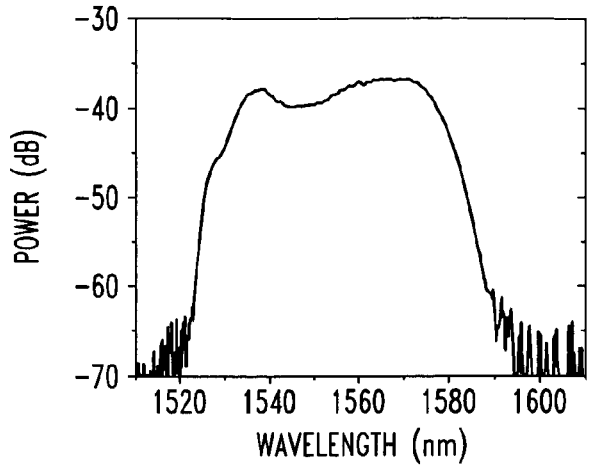
FIG. 5 is a plot of the mode-locked spectrum of the PMFE fiber laser of the embodiment of FIG. 4 of the present invention.
Figure 6:
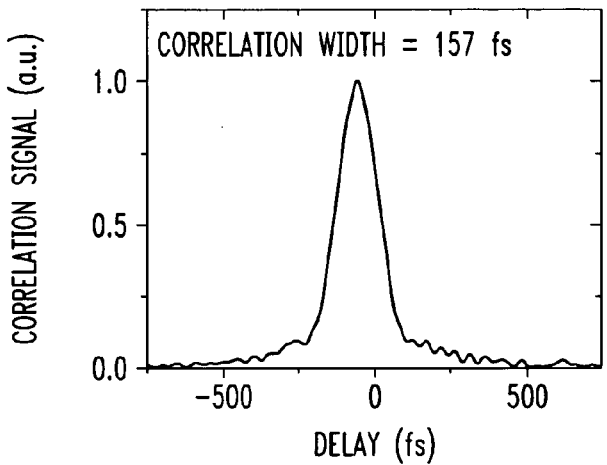
FIG. 6 is a plot of the autocorrelation function of output pulses from the embodiment of FIG. 4.

Using the particular arrangement of FIG. 4, significant reliability in constructing PMFE lasers has been achieved. Spectral widths as broad as 44 nm FWHM have been achieved, as shown in the plot of FIG. 5, which illustrates the mode-locked spectrum of the PFME laser of FIG. 4. FIG. 6 is a plot of the autocorrelation of the output pulses from the arrangement of FIG. 4, which demonstrated a pulse with of 157 fs. Indeed, pulse widths as short as 110 fs have been observed in arrangements similar to that shown in FIG. 4. In point of fact, without the addition of intentional loss bias in accordance with the present invention, the specific configuration shown in FIG. 4 cannot be guaranteed to modelock.

Figure 7:
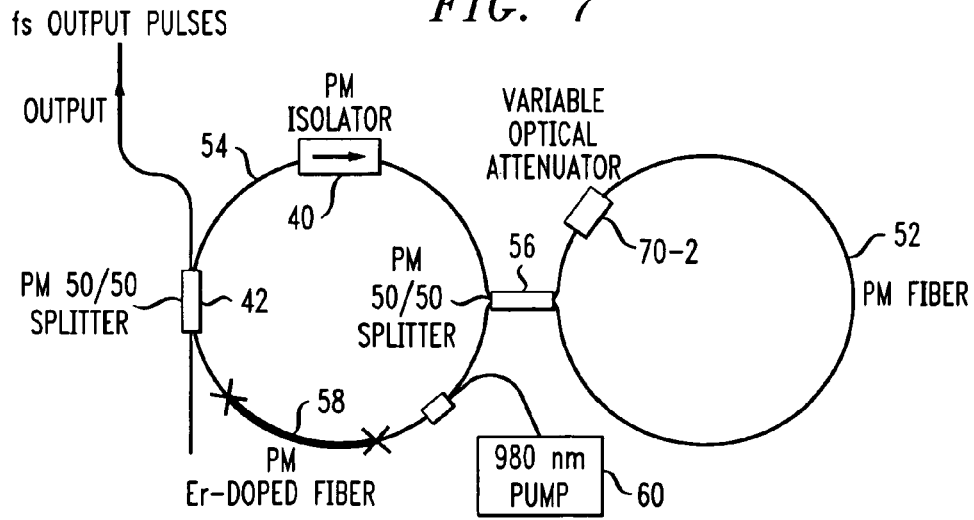
FIG. 7 is another embodiment of the present invention, utilizing a variable optical attenuator (VOA) in the bi-directional loop to generate ultrashort pulses.

FIG. 7 illustrates another exemplary loss element 70 which may be used in accordance with the present invention. In this example a variable optical attenuator 70-2 is disposed within bi-directional loop 52. The amplifying components (doped fiber section 58, pump source 60 and WDM 62) have been moved to unidirectional loop 54 in this particular embodiment; in general, the amplification may take place in either loop (or in both, as will be discussed hereinbelow in association with the embodiment of FIG. 9). Inasmuch as the desired gain can be created at any point within the closed system, the movement of the amplifying components to loop 54 may provide additional space along and around bi-directional loop 52 to insert VOA 70-2, depending on the size of element 70-2. Various and well-known types of attenuators may be used, such as introducing fiber bend losses, lossy splices, and the like. Any suitable element(s) may be used to introduce the phase difference required for the intensity-dependent ultrashort pulse generation.

With respect to the use of a "variable" element, the adjustment of the amount of introduced attenuation is performed upon manufacture, until the desired modelocking action is achieved. The adjustment, therefore, is performed on a laser-by-laser basis, and allows for the variations associated with manufacturing (as discussed above, particularly with respect to splice losses) to be compensated such that PMFE lasers may be produced in a reliable and reproducible fashion.

Figure 8:
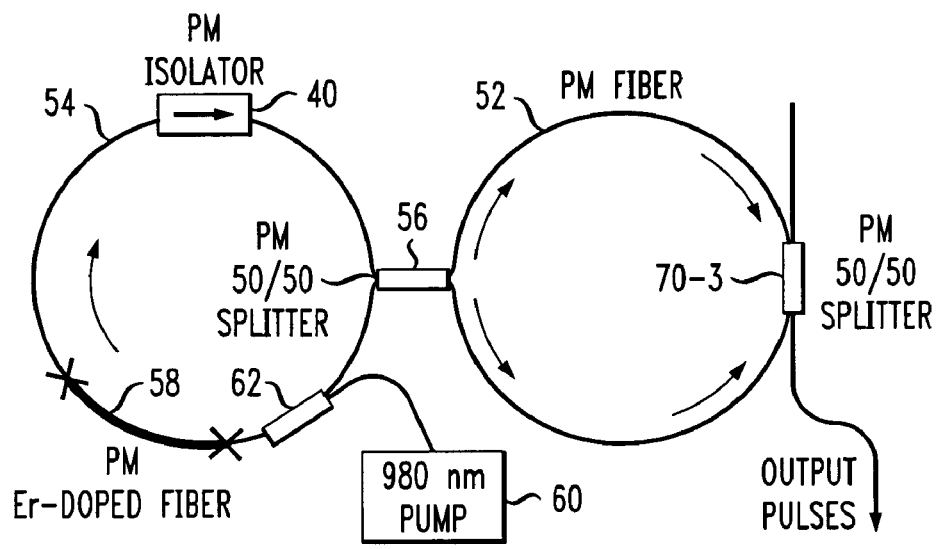
FIG. 8 shows yet another embodiment of the present invention, using an output coupler to create asymmetry in the loop configuration.

FIG. 8 shows another exemplary loss element 70, this case in the form of an output coupler 70-3 disposed within bi-directional loop 52 (instead of the conventional placement along unidirectional loop 54). The losses associated with coupler 70-3 may be configured to be sufficient to create the desired accumulation in phase that leads to ultrashort optical output pulses. Again, amplifying elements 58, 60 and 62 are shown as disposed along unidirectional loop 54, merely as a design choice.

Figure 9:
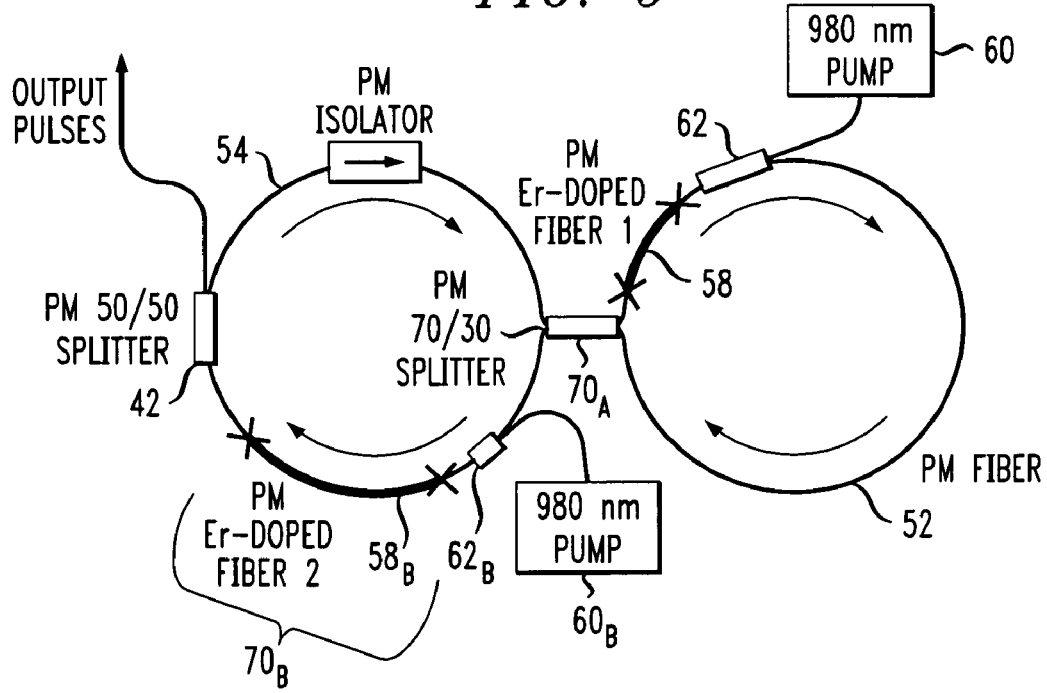
FIG. 9 illustrates an embodiment of the present invention where a second fiber amplifier is used to create the desired bias situation in the bidirectional loop.

It is also contemplated that more than one "loss element" may be used in a PFME laser of the present invention. FIG. 9 illustrates an exemplary PFME laser which utilizes an asymmetric splitter $70_A$ between unidirectional loop 54 and bi-directional loop 52 and a second amplifying arrangement $70_B$ positioned along unidirectional loop 54. In this embodiment, the amplifying components 58, 60 and 62 as described above are disposed within bi-directional loop 52. Referring to FIG. 9, second amplifying arrangement $70_B$ is shown as including a section of erbium-doped fiber $58_B$, which receives a pump input signal from a pump source $60_B$ (operating at 980 nm). A coupler, such as a wavelength division multiplexer (WDM) $62_B$ provides the introduction of the pump signal to doped fiber section $58_B$.

By changing the ratio of gain between the two amplifiers in this embodiment (which may be obtained by adjusting their relative pump powers), the bias introduced into the bi-directional loop may be changed, while maintaining a desired pulse energy.

It will be apparent to those skilled in the art that various modifications and variations can be made to the present invention without departing from the spirit or scope thereof. Thus, it is intended that the present invention cover the modifications and variations of the above-described embodiments, all of which are considered to fall within the spirit and scope of the invention as defined by the claims defined hereinbelow.

What is claimed is:

1. A mode-locked, polarization-maintaining figure-eight fiber laser for generating ultrashort optical output pulses, the laser comprising
   a bi-directional loop comprising a section of polarization maintaining optical fiber;
   a unidirectional loop comprising a section of polarization maintaining optical fiber;
   a first section of a polarization-maintaining amplifying medium inserted along the polarization maintaining optical fiber forming either one of the bi-directional loop and the unidirectional loop, the amplifying medium responsive to an incoming optical pump signal introduced to the fiber laser through an optical coupler, the incoming optical pump signal used to generate an amplified version of a propagating optical signal;
   a polarization maintaining directional coupler disposed between and coupled to both the bi-directional and unidirectional loops of polarization maintaining optical fibers, the maintained polarization state of the propagating optical signal providing a stable and constant modelocking state thereof; and
   an optical loss element in the bi-directional loop to introduce optical bias by creating an accumulation of a phase difference between a plurality of optical signals circulating within the bi-directional loop sufficient to generate an ultrashort optical output pulse therefrom and having an additional flexibility in tuning the bias of the bi-directional loop for a given cavity configuration.

2. A fiber laser as defined in claim 1 wherein the polarization-maintaining amplifying medium comprises a polarization-maintaining fiber amplifier.

3. A fiber laser as defined in claim 2 wherein the polarization-maintaining fiber amplifier comprises an erbium-doped fiber amplifier.

4. A fiber laser as defined in claim 1 wherein the polarization-maintaining amplifying medium comprises a semiconductor optical amplifier.

5. A fiber laser as defined in claim 1 wherein the laser further comprises
   an external perturbation source for introducing a perturbation into the propagating optical signal and initiating mode locking.

6. A fiber laser as defined in claim 5 wherein the external perturbation source comprises
   a polarization-maintaining modulation element for introducing a modulation perturbation to the propagating optical signal; and
   an external driver coupled to the modulation element or supplying an input modulation signal thereto.

7. A fiber laser as defined in claim 1 wherein the optical loss element comprises an optical attenuator coupled to the section of polarization maintaining optical fiber forming the bi-directional loop to provide a sufficient amount of attenuation to create a modelocking condition.

8. A fiber laser as defined in claim 7 wherein the optical attenuator comprises a variable optical attenuator to provide adjustment, on a laser-by-laser basis, of the amount of introduced attenuation until the desired modelocking action is achieved.

9. A fiber laser as defined in claim 1 wherein the optical loss element comprises at least one fiber bending element.

10. A fiber laser as defined in claim 1 wherein the optical loss element comprises at least one fiber splice along or between the bi-directional fiber loop and the unidirectional fiber loop.

11. A fiber laser as defined in claim 1 wherein the optical loss element comprises a second section of polarization-maintaining amplifying medium coupled to the section of polarization maintaining fiber forming the loop, where the gains of both the loop fiber and second section of polarization-maintaining amplifying medium are adjusted to create a phase difference sufficient to create modelocking and generate ultrashort optical output pulses.

12. A fiber laser as defined in claim 1 wherein the bi-directional loop and the unidirectional loop comprise sections of polarization maintaining single mode fiber.

13. A fiber laser as defined in claim 1 wherein the bi-directional loop and the unidirectional loop comprise sections of polarization maintaining multimode fiber.

* * * * *